US008098256B2

(12) United States Patent
Zipnick et al.

(10) Patent No.: US 8,098,256 B2
(45) Date of Patent: Jan. 17, 2012

(54) VIDEO ACQUISITION WITH INTEGRATED GPU PROCESSING

(75) Inventors: Jay Zipnick, Morgan Hill, CA (US); Brett Bilbrey, Sunnyvale, CA (US); Alexei V. Ouzilevski, Cupertino, CA (US); Fernando Urbina, Colorado Springs, CO (US); Harry Guo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 968 days.

(21) Appl. No.: 11/238,968

(22) Filed: Sep. 29, 2005

(65) Prior Publication Data
US 2007/0071343 A1    Mar. 29, 2007

(51) Int. Cl.
*G09G 5/00* (2006.01)
(52) U.S. Cl. ........ 345/581; 345/619; 345/502; 345/503; 345/504; 345/505; 345/522
(58) Field of Classification Search .................. None
See application file for complete search history.

(56) References Cited

U.S. PATENT DOCUMENTS

| 5,194,958 | A | * | 3/1993 | Pearman et al. ............... 348/97 |
| 5,754,231 | A | * | 5/1998 | Odaka et al. ............ 375/240.01 |
| 6,157,396 | A | | 12/2000 | Margulis et al. |
| 6,298,090 | B1 | * | 10/2001 | Challapali et al. ....... 375/240.29 |
| 6,340,994 | B1 | | 1/2002 | Margulis et al. |
| 6,438,254 | B1 | | 8/2002 | Kadono et al. ............... 382/107 |
| 6,778,182 | B2 | * | 8/2004 | Yamakawa .................. 345/589 |
| 6,982,722 | B1 | * | 1/2006 | Alben et al. ................. 345/596 |
| 7,269,785 | B1 | | 9/2007 | Halfant |
| 2001/0033332 | A1 | * | 10/2001 | Kato et al. .................. 348/211 |
| 2003/0032482 | A1 | * | 2/2003 | Nagayama .................... 463/42 |
| 2003/0156301 | A1 | * | 8/2003 | Kempf et al. ................ 358/486 |
| 2003/0214520 | A1 | * | 11/2003 | Throup et al. ............... 345/690 |
| 2004/0169663 | A1 | * | 9/2004 | Bernier ........................ 345/629 |
| 2004/0218830 | A1 | | 11/2004 | Kang et al. ................... 382/274 |
| 2005/0036558 | A1 | * | 2/2005 | Dumitras et al. ........ 375/240.29 |
| 2005/0066148 | A1 | * | 3/2005 | Luick ............................... 712/1 |
| 2005/0078214 | A1 | * | 4/2005 | Wong et al. .................. 348/452 |
| 2006/0007230 | A1 | * | 1/2006 | Hall et al. .................... 345/419 |
| 2006/0109102 | A1 | | 5/2006 | Gortz et al. |
| 2007/0035707 | A1 | | 2/2007 | Margulis |
| 2008/0049835 | A1 | | 2/2008 | Kimoto ................... 375/240.11 |

FOREIGN PATENT DOCUMENTS
WO    WO 2004079659 A1  *  9/2004

OTHER PUBLICATIONS

OmniVision, Advanced Information Product Brief, Version 1.2, Apr. 21, 2003, pp. 1-2.
OmniVision, OmniVision Expands the Landscape of Digital Imaging, http://www.ovt.com/pr_09_ 28a_2005.html, copyright 2004, pp. 1-3.

* cited by examiner

*Primary Examiner* — Kee M Tung
*Assistant Examiner* — Jwalant Amin
(74) *Attorney, Agent, or Firm* — Fish & Richardson P.C.

(57) ABSTRACT

Systems and techniques for processing sequences of video images involve receiving, on a computer, data corresponding to a sequence of video images detected by an image sensor. The received data is processed using a graphics processor to adjust one or more visual characteristics of the video images corresponding to the received data. The received data can include video data defining pixel values and ancillary data relating to settings on the image sensor. The video data can be processed in accordance with ancillary data to adjust the visual characteristics, which can include filtering the images, blending images, and/or other processing operations.

33 Claims, 10 Drawing Sheets

VIDEO ACQUISITION WITH INTEGRATED GPU PROCESSING

TECHNICAL FIELD

This description relates to processing video images, and more particularly to acquisition of video data with integrated processing using a graphics processing unit.

BACKGROUND

Image sensors can be used to detect video sequences that can be used by various client processes in a laptop or desktop computer environment. For example, detected video sequences can be used for webcam applications, videophone operations, or video editing. Conventional cameras for use with computers are external peripherals, although built-in cameras can also be used. Such cameras can use charge-coupled device (CCD) sensors or complementary metal-oxide semiconductor (CMOS) digital image sensors to detect images. CCD sensors are commonly used in digital still and video cameras and provide a relatively high quality image. CMOS sensors generally require less power and are less expensive but provide a lower quality image than CCD sensors, especially at low light levels.

SUMMARY

Techniques and systems can be implemented to improve the quality of images detected by image sensors to improve the quality of the detected images. In some implementations, the described techniques and systems can be used to enable CMOS sensors to be used in place of relatively expensive CCD sensors, such as to achieve comparable quality from a CMOS sensor as from a CCD sensor. In particular, processing can be performed using software, hardware, or a combination of the two to filter out noise, which is increasingly present as light levels decrease; increase dynamic range; improve the overall image quality and/or color fidelity; and/or perform other image processing. Such processing can be offloaded, at least in part, from a computer's central processing unit (CPU) to a graphics processing unit (GPU) to provide a more efficient use of resources and to support adequate frame rates and image resolutions.

In one general aspect, data corresponding to a sequence of video images detected by an image sensor is received. The received data is processed using a graphics processor to adjust one or more visual characteristics of one or more of the video images corresponding to the received data.

Implementations can include one or more of the following features. The sequence of video images includes image data received at about thirty frames per second. The received data includes pixel values for each of multiple pixels in each video image. The graphics processor is a processor having a vector-based instruction set and that automatically performs multiple iterations of one or more instructions on multiple data items. The processed data is forwarded to a central processing unit of the computer for use by a client process running on the central processing unit. The central processing unit performs one of compression or encoding of the processed data. The one or more visual characteristics include noise reduction, color correction, scaling, sharpness, and/or color calibration.

A first pixel shading program is used to calculate filtered motion data for a frame, and a second pixel shading program is used to calculate temporal-filtered pixel data for the frame. Two buffers associated with the graphics processor are provided for use in storing temporal-filtered pixel data for successive frames, and two buffers associated with the graphics processor are provided for use in storing filtered motion data for the successive frames. Each buffer stores input data or output data for one of the successive frames and stores the other of input data or output data for another of the successive frames. Temporal filtering performed by the second pixel shading program is based at least in part on the filtered motion data and a luminance value for areas of the frame.

Processing the received data involves performing gamma correction on one or more of the video images based on the luminance of an area of one or more of the video images. Alternatively or in addition, performing gamma correction involves applying a single-channel luminance modification to relatively dark areas of the one or more video images and applying a multi-channel luminance modification to other areas of the one or more video images. As another alternative, performing gamma correction can involve determining a single-channel gamma correction and a multi-channel gamma correction and interpolating the single-channel gamma correction and the multi-channel gamma correction using a linear or non-linear interpolation function. The linear or non-linear interpolation function can include an offset to increase a contribution of the multi-channel gamma correction.

Processing the received data can involve detecting motion between a particular frame and a preceding frame in the sequence of video images and filtering the particular frame using the preceding frame based at least in part on detected motion. Filtering the particular frame can also be based at least in part on an estimated noise level for the particular frame and/or on a luminance value of pixels in the particular frame. Processing the received data can include filtering motion data, such as by assigning a motion value for each pixel according to a maximum motion of the pixel and at least one adjacent pixel.

Processing the received data can include alternately generating motion data for a frame using motion data for a preceding frame stored in a first texture buffer and storing the motion data for the frame in a second texture buffer. Motion data for a subsequent frame can be generated using the motion data stored in the second texture buffer, and the motion data for the subsequent frame can be stored in the first texture buffer. Processing the received data can further include alternately filtering pixel data for a frame using filtered pixel data for a preceding frame stored in a third texture buffer and filtering pixel data for a subsequent frame using the filtered pixel data stored in the fourth texture buffer. The filtered pixel data for the frame can be stored in a fourth texture buffer, and the filtered pixel data for the subsequent frame can be stored in the third texture buffer. The motion data can include a value indicating an estimated degree of motion between frames and a value indicating a filtering strength. Processing the received data can include filtering the particular frame using the preceding frame based at least in part on an estimated noise level for the particular frame. The received data is processed using both single-channel gamma correction and multi-channel gamma correction. A polynomial function is used to interpolate the single-channel gamma correction and the multi-channel gamma correction according to a luminance value.

In another general aspect, an image processing system includes a processor and a graphics processor. The processor is operable to receive data defining to a sequence of video images from an image sensor. The graphics processor is operable to process the received data to adjust one or more visual characteristics of one or more of the video images defined by the received data.

Implementations can include one or more of the following features. The processor is further operable to preprocess the received data before sending the received data to the graphics processor. The processor receives processed data from the graphics processor for use by a client application. The graphics processor includes at least a first texture buffer and a second texture buffer and is operable to alternately process received data for a frame using processed data from a preceding frame stored in the first texture buffer and process received data for a frame using processed data from a preceding frame stored in the second texture buffer. Processing the received data using processed data stored in the first texture buffer generates new processed data that is stored in the second texture buffer, and processing the received data using processed data stored in the second texture buffer generates new processed data that is stored in the first texture buffer. The graphics processor processes the received data based on a detected amount of motion between successive frames and an estimated noise level for each particular frame.

In another general aspect, video data detected by an image sensor and defining a sequence of frames is received. Ancillary data indicating one or more characteristics ancillary to the video data is also received. The video data is processed based, at least in part, on the ancillary data to produce converted frames.

Implementations can include one or more of the following features. The ancillary data includes a temperature in a vicinity of the image sensor, and processing the video data comprises adjusting one or more parameters or algorithm based on the temperature. Alternatively or in addition, the ancillary data includes settings data for the image sensor. The settings data indicates one or more adjustable setting of the image sensor used for sensing at least a portion of the video data. The video data is received in packets that include video data and associated settings data. Multiple packets are used to transfer each frame of video data. The packets are buffered until at least one complete frame is received. The settings data is provided in response to a query from a video digitizer.

Processing the video data involves processing video image frames to perform temporal filtering. Processing frames to reduce noise involves increasing a contribution from at least one preceding frame. A strength of filtering is determined for each frame based on the settings data. Processing the video data involves determining when to change modes for performing dynamic range expansion. The settings data one or more gain levels, a current luminance, an average luminance, and/or one or more modes.

In another general aspect, data defining a sequence of frames detected by an image sensor is received. The received data includes video data defining color values and luminance values for each frame and ancillary data defining one or more conditions relating to the detected frames. A degree of motion between a frame of the sequence of frames and one or more preceding frames is determined for one or more areas of the frame. Video data for the frame is filtered by adjusting the video data using video data from one or more preceding frames based, at least in part, on the degree of motion, the ancillary data, and the luminance values.

Implementations can include one or more of the following features. The video data defines color values and luminance values for each of multiple pixels, and a degree of motion is determined using a maximum detected motion among each pixel and at least four adjacent pixels. The video data from one or more preceding frames includes filtered video data for the preceding frame. The video data includes motion data. Alternatively or in addition, the video data defines color values and luminance values for each of multiple pixels and the filtered motion data for the frame comprises a detected motion for each pixel adjusted according to a degree of motion for each pixel of the preceding frame and a filtering parameter for each pixel of the preceding frame. The filtering parameter is based, at least in part, on an estimated level of noise for each pixel of the preceding frame. The estimated level of noise is determined according to the ancillary data and the luminance values, and the ancillary data includes settings data received from the image sensor. Each frame includes multiple pixels and the video data includes pixel values. The filtered video data for the frame is calculated using a pixel value for each pixel, a filtered pixel value for each pixel of the preceding frame, and a filtering parameter for each pixel of the frame. The filtering parameter is based, at least in part, on an estimated level of noise for each pixel of the preceding frame, and the estimated level of noise is determined according to the ancillary data and the luminance values. The filtering parameter for each pixel is used to adjust each of the pixel value and the filtered pixel value of the preceding frame in calculating the filtered video data.

In another general aspect, a sequence of frames is detected by an image sensor. The frames are detected using two or more different gain levels. A frame is blended with one or more other frames detected using a different gain level to produce a blended frame for replacing the frame in the sequence of frames.

Implementations can include one or more of the following features. The sequence of frames is a portion of a video sequence. The frame includes multiple pixel values and blending the frame with one or more other frames involves normalizing each pixel value for the frame and the one or more other frames, adjusting the normalized pixel values using blending factors, and combining the adjusted, normalized pixel values to generate a blended pixel value. Normalizing each pixel value involves compensating for the gain level used to detect the pixel value. A degree of motion between frames in the sequence of frames is estimated for each of multiple pixels in a particular frame. It is determined whether the degree of motion for each pixel exceeds a threshold, and, if so, compensation for the gain level used to detect the pixel is performed to produce a replacement pixel for replacing the pixel in the particular frame. Detecting motion between frames involves comparing corresponding pixels in successive frames detected using a particular gain level. Compensation for the gain level of successive frames in the sequence of frames can also be performed, and detecting motion between frames can involve comparing corresponding pixels in gain-compensated, successive frames. Temporal filtering of the blended frames is performed.

Pixel data for a subsequent frame in the video sequence is received, and the pixel data for the subsequent frame is blended with the pixel data from a subset of the preceding frames to generate a subsequent blended frame for the video sequence. Motion between frames is detected based on the pixel data. Blending of pixel data is performed only for pixels having motion below a selected threshold. Compensation for gain levels associated with pixels having motion above the selected threshold is performed. Motion is detected between one of the frames and a preceding frame with a same gain level or between one of the frames and a preceding frame with a different gain level. The pixel data is blended using a weighted combination of the pixel data. Each pixel of the blended frame includes a combination of weighted pixel data terms, and each pixel data term is weighted using a blending factor corresponding to a luminance value of the pixel. Multiple temporally spaced blended frames are filtered to reduce noise. Motion is detected for use in determining whether to blend frames and for use in determining a strength of temporal filtering.

In yet another general aspect, a system for expanding the dynamic range of a video sequence includes a memory for storing a sequence of frames detected by an image sensor. The frames are detected using two or more different gain levels. A first module is operable to detect motion between frames in the sequence, and a second module is operable to blend frames in the sequence to produce processed frames with an expanded dynamic range. A degree of blending is based on whether motion is detected.

Implementations can include one or more of the following features. The sequence of frames includes one or more frames detected using a first gain level and two or more frames detected using a second gain level. The first module is operable to detect motion based on a comparison between frames detected using the second gain level, and the second module is operable to blend a frame detected using the first gain level and a frame detected using the second gain level. A filter is operable to filter the blended frames to remove noise based, at least in part, on the gain level of the blended frames. The memory includes a circular buffer for storing the sequence of frames.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
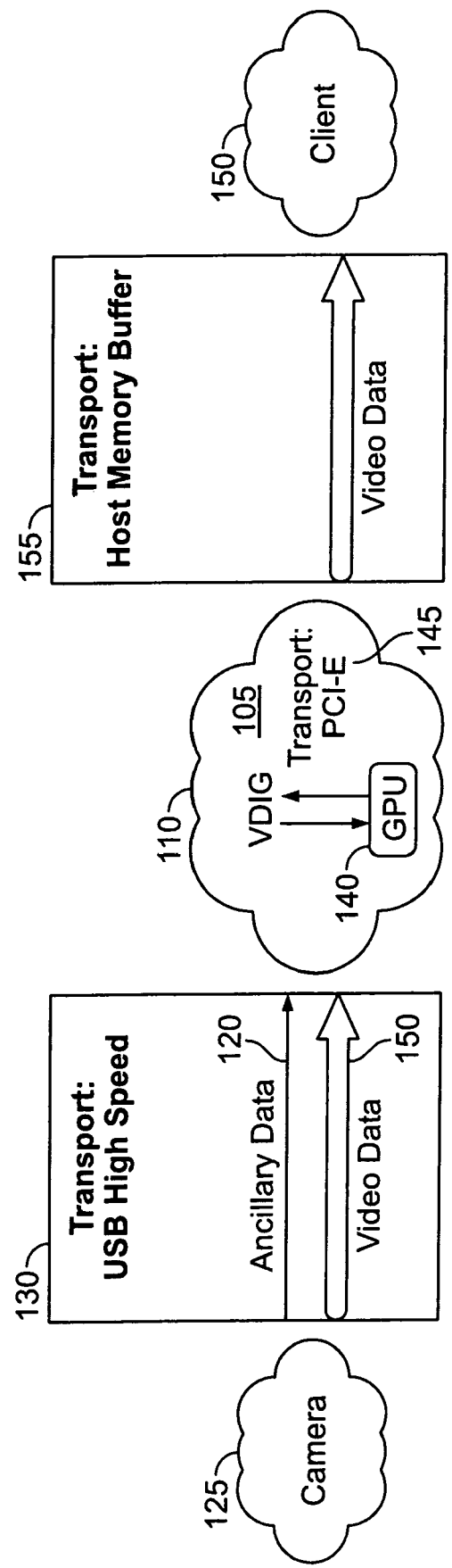
FIG. 1 is a block diagram of a video acquisition system.

FIG. 1 is a block diagram of a video acquisition system 100 in which a digitizing pipeline 105 is implemented in a host device 110 that receives both video data 115 and ancillary data 120 from a camera 125. The camera 125 can include an image sensor, such as a CMOS digital image sensor or a CCD sensor for detecting images. In addition, the camera 125 can perform processing on detected images and/or to adjust settings for detecting images. For example, the camera 125 can perform functions such as automatic exposure, white balancing, fixed pattern noise reduction, color processing, sharpness, resizing, and other functions. The camera 125 can be a peripheral device that is separate from the host device 110 or can be built into the host device 110. In a typical implementation, the host device 110 is a notebook computer or a desktop computer, although the host device 110 can be implemented using other types of processing devices. The camera 125 can have virtually any resolution (e.g., 640×480 or 1200× 675).

In the illustrated implementation, the camera 125 sends data to the host device 110 on a USB high-speed connection 130, although other implementations can use any type of bus, cable, wireless interface, or other signaling connection. The data sent to the host device 110 from the camera 125 includes video data 115 that defines the appearance of detected images (e.g., pixel values) and ancillary data 120 that defines other information relating to the detected images (e.g., settings and states of the image sensor in detecting the images). The ancillary data 120 can include, for example, information above and beyond data included in the Universal Serial Bus Device Class Definition for Video Devices, Revision 1.1, published by the USB Implementers Forum. The video data 115 can be in any format, such as YUV format with 4:2:2 subsampling (e.g., using a 2vuy or other compression type) or RGB 4:4:4 format. For purposes of this description, the term "YUV" is not limited to true YUV values but includes data and values scaled according to Y'UV, Y'CbCr, and Y'PbPr scale factors, where the prime symbol indicates nonlinearity. Similarly, the term "luminance" includes luma, which is a weighted sum of nonlinear (gamma-corrected) R'G'B' components used to approximate true CIE luminance for purposes of video systems.

The ancillary data 120 can also be received from other peripheral devices and/or components internal or external to the host device 110, including from other modules included in the host device 110. For example, the host device 110 can receive temperature information from temperature sensors, such as those used to control fans for cooling a notebook, desktop, or other computer system. Ancillary data 120 such as temperature information can be used to determine conditions, states, or settings that exist at the time or approximately at the time that images are detected.

The host device 110 includes a video digitizing pipeline 105 for processing data received from the camera 125. The video-digitizing pipeline 105 is typically implemented on a CPU using one or more software modules, such as a Quick-Time video digitizer component, available from Apple Computer Inc. of Cupertino, Calif. and other providers of Quick-Time-compatible video input systems. As illustrated, the video digitizer 105 can communicate with a graphics processing unit (GPU) 140 that is part of the host device 110 or that is communicably coupled to the host device 110. The GPU 140 can perform some functions of the video digitizer 105. In particular, video and graphics processing functions of the video digitizer 105 can be offloaded to the GPU 140. The GPU 140 is a single-chip microprocessor specifically designed for processing three-dimensional graphics data, such as the GeForce products available from NVIDIA Inc. of Santa Clara, Calif., or GPUs available from ATI Technologies Inc. of Markhan, Ontario, or integrated graphics solutions available from Intel Corporation of Santa Clara, Calif. The GPU 140 includes a vector-based instruction set and operates to automatically perform multiple iterations of a single instruction (or multiple instructions) on multiple data items. For example, the GPU 140 operates to automatically perform multiple iterations of a particular instruction on a set of pixel values and, as such, can perform processing of graphics data much more efficiently than a CPU.

The CPU communicates with the GPU 140 using a relatively high-speed connection, such as Peripheral Component Interconnect Express (PCI-E) 145. The video digitizer 105 is used to perform auxiliary or supplemental processing of the data received from the camera 125. The auxiliary processing can include spatial and/or temporal noise reduction, color processing (e.g., correction or calibration), sharpness adjustments, resizing, and/or optional effects, such as flipping an image. In some implementations, at least most of the auxiliary processing is performed on the GPU 140, although the CPU can be used to perform some pre- or post-processing, such as formatting, masking, compressing, or encoding. The auxiliary processing that is performed on the GPU 140 can be performed using pixel shading programs (or pixel shaders), such as fragment programs that comply with Open GL Architecture Review Board (ARB) standards. ARB fragment programs are written in a generic assembly language that can be translated into the native language of, for example, NVIDIA, ATI, Intel integrated graphics processors, and the like.

The video-digitizing pipeline 105 generates processed video data that can be used by a client process 150. The processed video data can be transported to the client process 150 using a memory buffer 155 and/or using some type of bus, network, wireless interface, and/or other interconnection. The client process 150 can reside on the host device 110 or on a different device. The processed video data can be used relatively immediately from the memory buffer 155 or can be stored relatively long term on a storage device for later use by the client process 150. The client process 150 can include, for example, any type of software application designed to receive and/or operate on video data, such as iChat videoconferencing software, QuickTime multimedia software, and iMovie video processing, all available from Apple Computer Inc. of Cupertino, Calif.; EvoCam webcam software available from Evological Software at www.evological.com; BTV Pro video processing software available at www.bensoftware.com; and other video editing and/or processing software.

Figure 2:
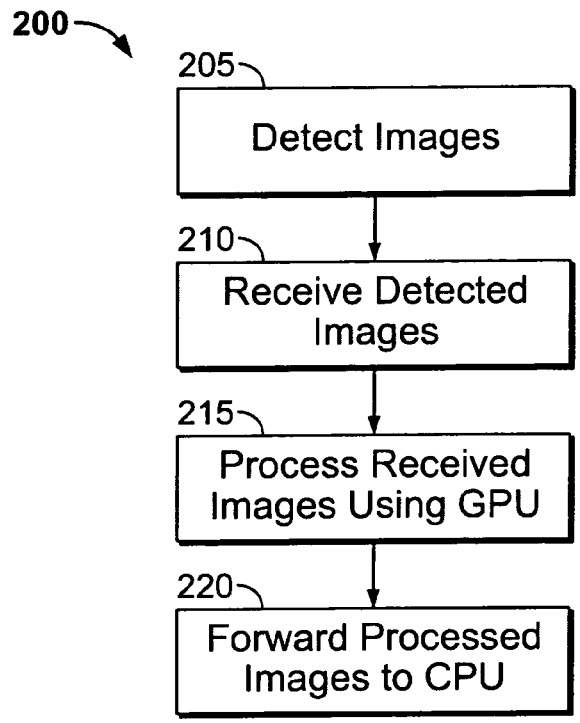
FIG. 2 is a flow diagram of a process for processing video images using a graphics processor.

FIG. 2 is a flow diagram of a process 200 for processing video images using a graphics processor. Video data and/or ancillary data for a sequence of video images is detected by an image sensor and/or by other peripheral components (205) and received by a computer (210). The video data generally includes pixel values for the various pixels in each image. In some implementations, the video images are generally detected and received at a rate of about thirty frames per second, although lower (e.g., twelve or twenty five frames per second) or higher (e.g., sixty frames per second) frame rates can also be used. In some instances, video images can be received at a rate of about thirty frames per second in normal or bright lighting conditions and at a lower rate (e.g., about fifteen frames per second in low lighting conditions. Typically, the data is received by a CPU.

The received data is forwarded to and processed using a graphics processor to adjust one or more visual characteristics of the video images represented by the received data (215). The received data can be processed to reduce temporal and/or spatial noise, correct and/or calibrate color, scale images, and/or adjust sharpness. Temporal noise reduction generally involves using pixel data from one or more preceding or subsequent frames in a sequence of video images to filter apparently erroneous deviations in pixel values between temporally separated images. Spatial noise reduction generally involves using pixel data from one or more adjacent pixels in an image to filter apparently erroneous pixel values. Such errors in pixel values are relatively prevalent in lower quality image sensors and/or in low lighting conditions. The filtering that is performed does not necessarily eliminate the errors, but it can significantly reduce their prominence.

After processing by the graphics processor, the processed data is forwarded back to the CPU or stored in memory for use by one or more client processes running on the CPU and/or on different devices (220). In some implementations, a client process on the CPU can perform compression, encoding, or reformatting of the processed data received from the graphics processor before forwarding the data along for use by other client processes. In general, by offloading processing of video frames to the graphics processor, processing resources and/or power consumption of the CPU can be saved or used for other purposes.

Figure 3:
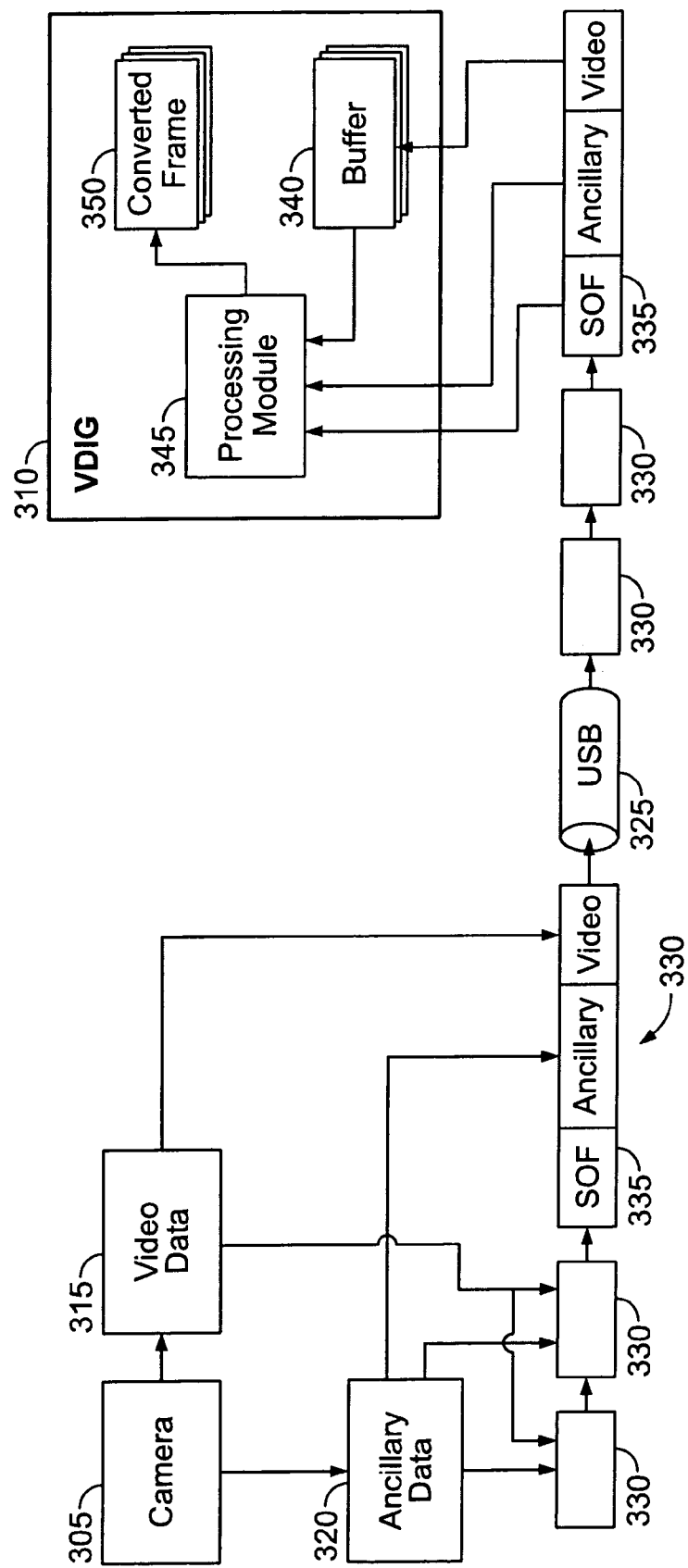
FIG. 3 is a schematic diagram of a system for sending data from a camera to a video digitizer.

FIG. 3 is a schematic diagram of a system 300 for sending data from a camera 305 to a video digitizer 310. The data includes video data 315, which defines images detected by the camera, and ancillary data 320, which defines camera settings and/or other information relating to the state of the camera and/or the environment during or at approximately the time at which the images are detected. The ancillary data 320 can include, for example, values from a subset of registers included in the camera that store status and control data, such as RGB (red, blue, and green) gain levels (i.e., the amount of gain applied in detecting red, blue, and green components of each pixel), current luminance, time-averaged luminance, and auto-exposure and/or white balance mode control. Other information can also be included in the ancillary data 320.

In some implementations, data is sent from the camera 305 to the video digitizer using a USB bus 325, so the data is segmented into packets. When the camera 305 detects a new frame, the camera 305 generates a packet 330 that includes a start of frame (SOF) marker 335, a portion of the video data 315, and a portion of the ancillary data 320. Portions of the video data 315 and the ancillary data 320 are also inserted into subsequent packets 330 until the entire frame is transferred. In some implementations, the end of the frame can be indicated by an end of frame marker. In addition, packets can be generated and sent during the process of detecting the image.

Generally, the ancillary data 320 included in a packet 330 corresponds to the video data 315 also included in the packet 330. In some cases, it is not necessary to include ancillary data 320 in every packet 330. Instead, ancillary data 320 can be inserted into packets 330 to the extent there is a change in the ancillary data 320 since the last time it was included in a packet 330. Accordingly, it may be possible for ancillary data 320 associated with one frame to apply for the entire frame or for multiple frames. In other cases, new ancillary data 320 may be included when there is a change in settings or other information in the middle of a frame. In another alternative, ancillary data 320 can be sent in response to a query from the video digitizer 310, although such a technique may result in a delay in recognizing updated settings.

On the receiving end, a determination that the complete frame has been received can be determined based on the receipt of a new start of frame marker 335 (or the receipt of an end of frame marker). The video data 315 from the packets 330 is extracted into one or more buffers 340 associated with the video digitizer 310. Each buffer 340 can store data for one frame. Thus, the use of multiple buffers 340 allows the video digitizer 310 to store multiple frames (e.g., to enable processing of one frame while capturing another). In addition, the video digitizer 310 can timestamp each frame that is received by inferring a time from when the start of frame marker 335 is received on the USB transport wire 325, which may precede processing and/or further delivery of the processed frame by tens of milliseconds. The ancillary data 320 is provided for use by processing code 345 of the video digitizer. For example, the ancillary data 320 can be used to estimate an amount of noise in the video data 315 and/or to control filtering strengths for reducing noise. Dimmer lighting conditions generally need higher gain levels to provide acceptable images. Higher gains also amplify noise, and, as a result, the gain level can be used to estimate the ratio of signal to noise in the video data 315.

The types of ancillary data 320 that are included in the packets 330 and/or that are used by the video digitizer 310 can depend upon the type of camera 305. In particular, the ancillary data 320 and the processing code 345 (or parameters associated therewith) can be tuned for the type of camera 305. The processing code 345 can include instructions for performing noise reduction, resizing, color correction or calibration, image sharpening, and/or formatting changes. The processing code 345 can be implemented in a CPU and/or a graphics processor. Once a complete frame is received, the video data 315 for that frame stored in the buffer 340 is processed using the processing code 345 to generate converted frames 350, which can be sent to a client device or process. The converted frames 350 can also be stored in one or more buffers, each of which can store a different converted frame 350. By storing multiple converted frames 350, the converted frames 350 can be queued for delivery to the client device or process (e.g., in case the client takes too much time handling one frame before requesting the next frame). The timestamps provided by the video digitizer 310 can be used by the client to determine the time at which each of the queued frames was detected.

Figure 4:
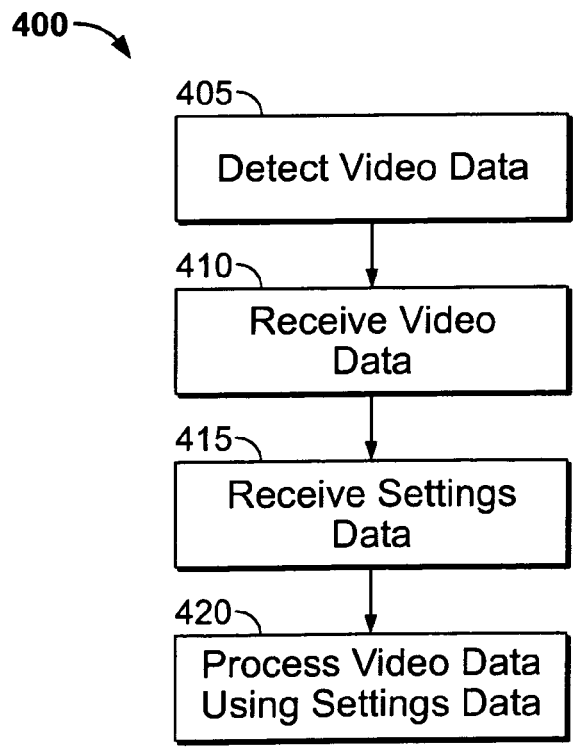
FIG. 4 is a flow diagram of a process for processing detected images.

FIG. 4 is a flow diagram of a process 400 for processing detected images. Video data for a sequence of video images is detected by an image sensor (405) and received by a computer (410). Settings data for the image sensor is also received by the computer (415). Typically, the settings data reflects settings for the image sensor at the time or approximately the time the video data is detected. The settings data includes gain levels, luminance information, and/or other information relating to adjustable settings of the image sensor and detected environmental conditions. The video data is processed using the settings data to produce converted frames (420). For example, the settings data can be used as a parameter or variable in one or more processing algorithms used to convert the video data into converted frames.

Figure 5:
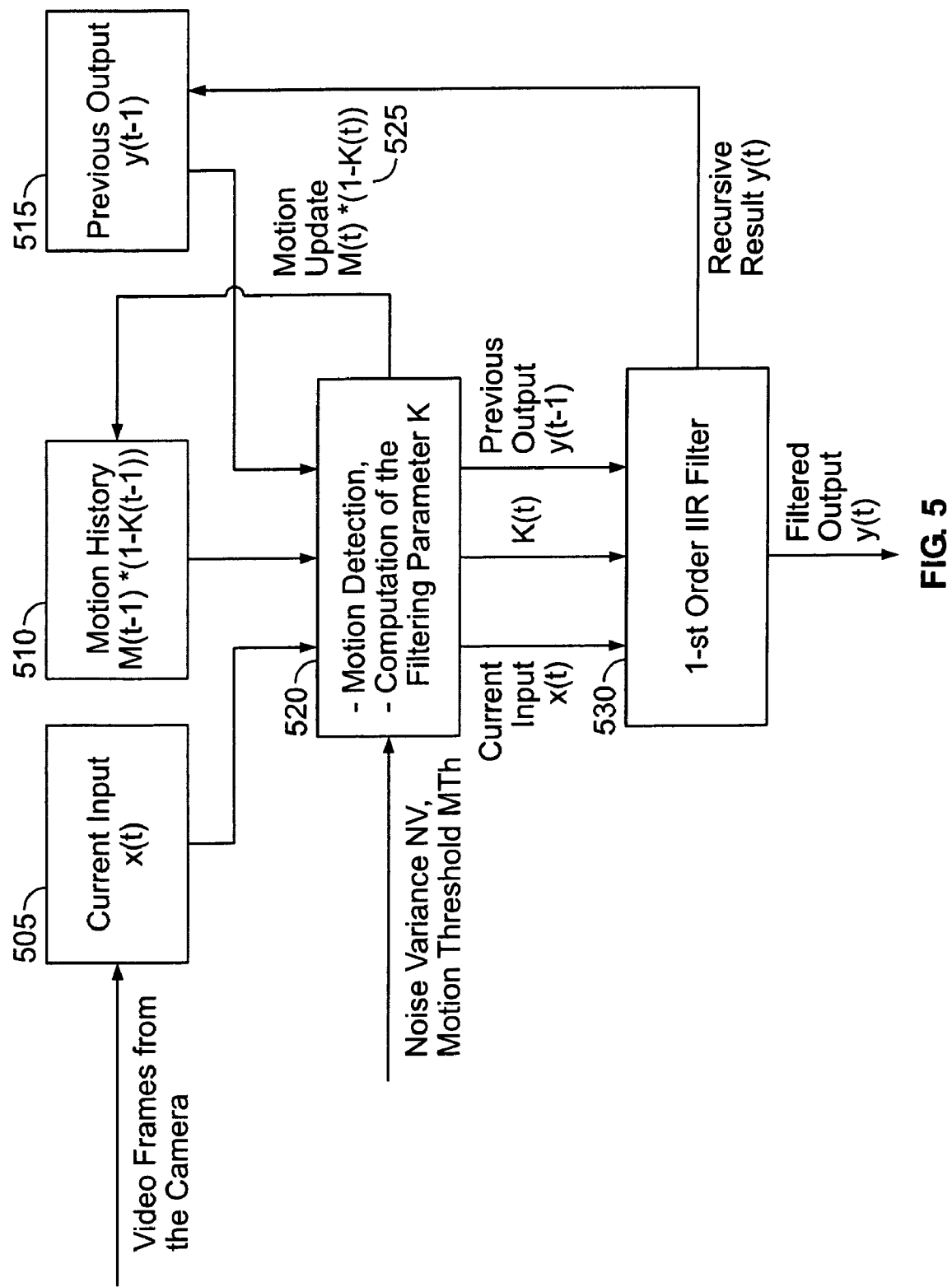
FIG. 5 is a block diagram of a temporal filter for reducing noise in a sequence of video images.

FIG. 5 is a block diagram of a motion-adaptive temporal filter 500 for reducing noise in a sequence of video images. Filtering of the video images can be performed using known equations that are based on a Kalman filter. Frames of video from a camera constitute a current input $x(t)$ and are stored in an input buffer 505. The current input $x(t)$ includes the pixel values for each pixel in an input image (i.e., the current frame). A motion history buffer 510 stores weighted motion data for a preceding frame. The weighted motion data serves as a pixel-by-pixel measure of motion between successive images in the sequence of video images. An output buffer 515 stores a filtered frame (i.e., output pixel values) for the preceding frame. A motion detection module 520 serves to detect motion between successive frames based on the data stored in the input buffer 505, the motion history buffer 510, and the output buffer 515. In addition, the motion detection module 520 receives a noise variance parameter (NV, which can be a function of camera parameters, such as gain, and/or $x(t)$)) and one or more motion threshold parameters (e.g., $MTh_0$, $MTh_1$, $MTh_2$, which may be defined in units of luminance) for use in determining a filtering strength.

The noise variance parameter is computed as a function of ancillary data. In some implementations, the ancillary data is received from the camera or image sensor. In addition, the noise variance parameter for each pixel can be a function of the brightness level of the pixel. For example, the noise variance parameter can be computed as a function of the gain level (e.g., RGB gains) used for detecting the input frame and/or the brightness level of each pixel. Alternatively, the noise variance parameter can be determined using a look-up table based on the gain level and/or the brightness level of each pixel. In general, lower lighting conditions result in a higher gain level, a higher noise level, and a stronger filter (i.e., more of a contribution from the preceding filtered output frame). The motion threshold parameter can be a predetermined threshold value that is manually or automatically defined.

The motion detection module 520 generates two outputs. One output is an updated weighted motion data vector 525 for the current frame. The updated weighted motion data vector 525 is based in part on a current motion vector CurrentMotion (t). The current motion vector indicates an amount of motion between the current frame and the preceding frame and can be calculated using any one of a variety of different techniques. For example, motion values for each individual pixel in the current motion vector can be calculated based on an absolute difference between the pixel in the preceding filtered frame and the pixel in the current frame. The difference can be based on a difference in luminance values for corresponding pixels in the two successive frames. In some implementations, the value for each pixel in the current motion vector can be defined as the maximum of the motion values for the pixel and four of its closest neighbors (i.e., left, right, top, and bottom). A filtered motion vector M(t) is calculated as:

$$M(t) = \text{CurrentMotion}(t) + M(t-1)*(1-K(t-1)), \quad (1)$$

where the second term of the filtered motion vector is the weighted motion data for the preceding frame. For an initial frame in a video sequence, the weighted motion data for the preceding frame is equal to zero.

Another output is a filtering parameter K(t), which is calculated as:

$$K(t)=1, \text{ for } M(t)>MTh_0 \text{ or } x(t)>MTh_2,$$

$$K(t)=M(t)/(M(t)+NV(\text{CameraParameters}, x(t))), \text{ for } M(t)<MTh. \quad (2)$$

The CameraParameters value can include one or more parameters or settings data received from the camera. Alternatively or in addition, the noise variance can be based on ancillary data obtained from other sources, although such a feature is not explicitly included in equation (2). For an initial frame in a video sequence, the filtering parameter is equal to one, and the filter is disabled. The filtering parameter K(t) is used to determine a filtering strength (e.g., 1−K(t)), which corresponds to a degree to which a previous filtered output y(t−1) is combined with the current input x(t) to generate a current filtered output y(t). Due to an infinite impulse response (IIR) nature of the filter, motion blur artifacts may occur and tend to be more visible in bright areas, which is also where noise is less perceptible and a signal-to-noise ratio (SNR) is high. By using of the motion thresholds $MTh_0$ and $MTh_2$, the filter is disabled in the area of relatively high motion and/or relatively bright luminance. Thus, the estimated amount of noise is determined, for example, by the gain level used to detect the current frame and/or by the lighting conditions. The updated weighted motion data vector 525 is calculated using the filtering parameter K(t) and has a value of:

$$M(t)*(1-K(t)). \quad (3)$$

The updated weighted motion data vector 525 is stored in the motion history buffer 510. In some implementations, instead of calculating and storing the updated weighted motion data vector 525, the motion history buffer 510 can store the filtered motion vector M(t) and the filtering parameter K(t) individually; in such a case, the weighted motion data vector 525 can be calculated by the motion detection module 520, as needed for performing motion detection on the next frame.

Figure 14:
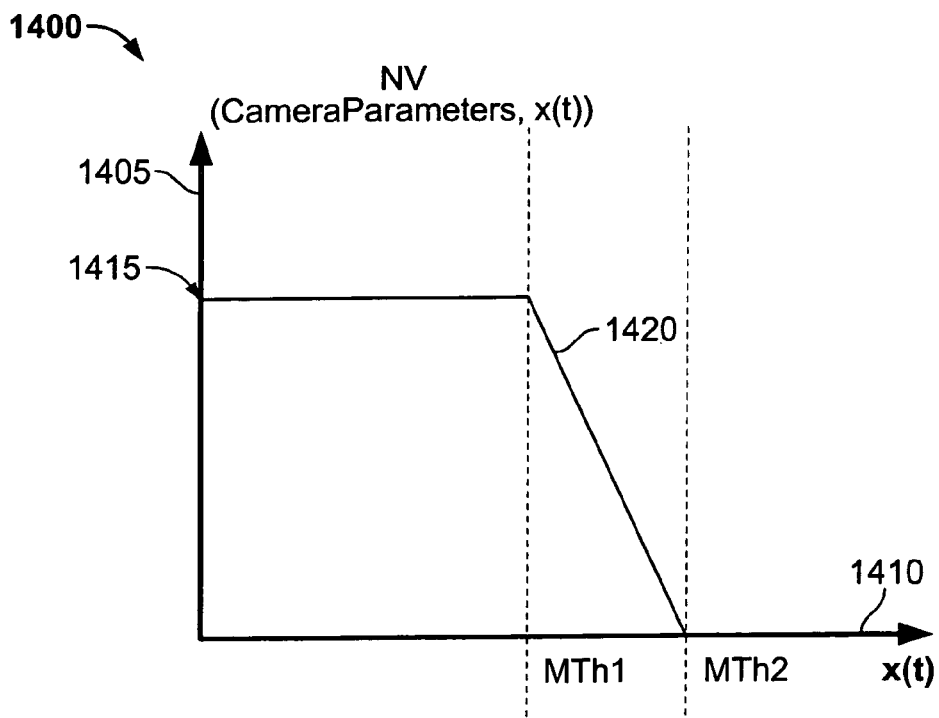
FIG. 14 is a graph of one example of a function for determining a value of an adaptive noise variance parameter (NV).

FIG. 14 is a graph 1400 of one example of a function for determining a value of an adaptive noise variance parameter (NV). The vertical axis 1405 corresponds to the noise variance value, and the horizontal axis 1410 corresponds to the current input x(t). The initial value 1415 of the noise variance (e.g., 28, 32, 64, or 92) is determined based on the camera parameters (or on other ancillary data) and is used for pixel values of the current input x(t) that are less than a motion threshold $MTh_1$. The noise variance value (as indicated at 1420) decreases linearly from the initial value 1415 to zero for pixel values of the current input x(t) between the motion thresholds $MTh_1$ and $MTh_2$ (e.g., between pixel luminance values of 200 and 230). The noise variance value is zero for pixel values of the current input x(t) above the motion threshold $MTh_2$. Thus, the adaptive noise variance parameter can be defined for each pixel as:

$$NV = NV_0, \text{ for } x(t) < MTh_1, \quad (4)$$
$$= NV_0 * (MTh_2 - x(t))/(MTh_2 - MTh_1),$$
$$\text{for } MTh_1 < x(t) < MTh_2,$$
$$= 0, \text{ for } x(t) > MTh_2,$$

where $NV_0$ is a function of the camera parameters (e.g., gain for each pixel) or other ancillary data.

The temporal filter 500 also includes a first order infinite impulse response (IIR) filtering module 530. The inputs to the first order IIR filtering module 530 include the filtering parameter K(t), the current input x(t) and the previous filtered output y(t−1). The first order IIR filtering module 530 calculates a current filtered output y(t) as:

$$y(t)=K(t)*x(t)+(1-K(t))*y(t-1). \quad (5)$$

The current filtered output y(t) is stored in the output buffer 515 and is provided as a processed or converted frame for use by a client process. The motion history buffer 510 and the output buffer each can be implemented using a double buffer technique, as described below in connection with FIG. 8.

In some implementations, other ancillary data can also be used in processing frame data. For example, ancillary data relating to operating temperature can be used to determine whether the image sensor and/or other components are subject to temperature outside of predetermined thermal specifications, which can cause some fixed pattern noise in the detected images. Such fixed pattern noise can show up as red and blue pixels at fixed locations that vary between different sensors and can be exacerbated in low light and high heat. This other ancillary data can be used to modify the noise reduction parameters or algorithms or to implement additional image processing (e.g., when the sensor is too hot). Such processing can be implemented in the motion detection module 520, the first order IIR filtering module 530, or the blending module 1145 of FIG. 11, as part of the GPU or another processing component.

Figure 6:
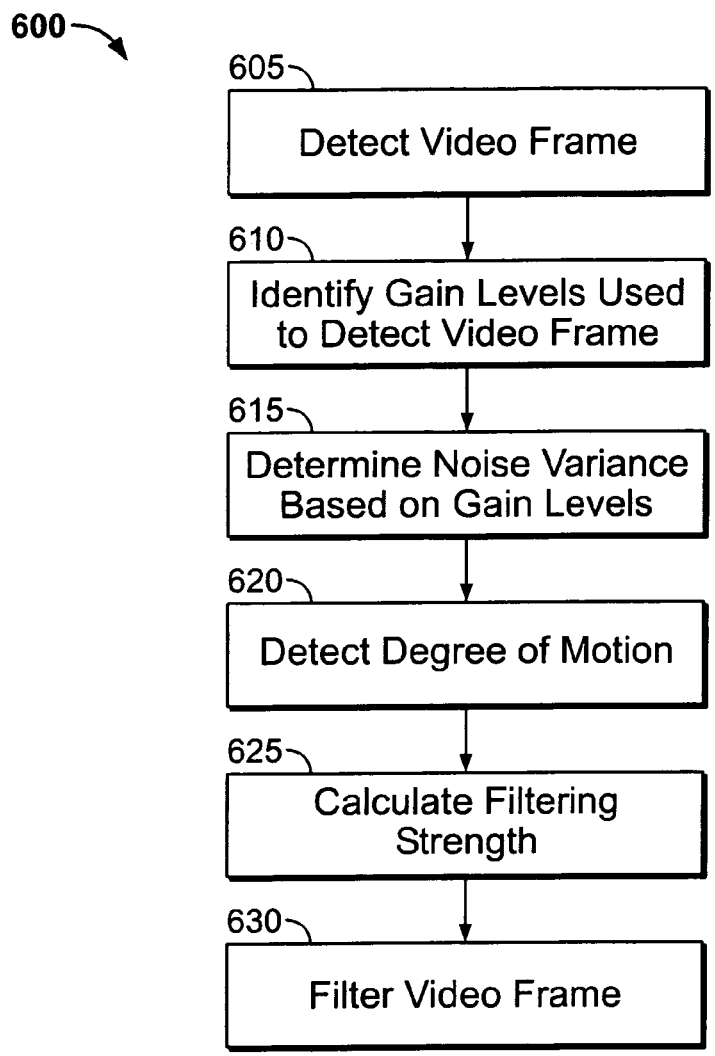
FIG. 6 is a flow diagram of a process for filtering images in a sequence of video frames.

FIG. 6 is a flow diagram of a process 600 for filtering images in a sequence of video frames. A video frame is detected using an image sensor (605). Gain levels used by the image sensor are also identified (610). A noise variance is determined based on the gain levels (615). The noise variance defines an estimated noise level for the video frame. A degree of motion is detected between the video frame and a preceding frame in the sequence of video frames (620). In some implementations, the degree of motion can be based on a comparison of the video frame with an unprocessed version of the preceding frame. In other implementations, the degree of motion can be based on a comparison of the video frame with a processed or filtered version of the preceding frame. In some implementations, the degree of motion can further include a contribution of detected motion from one or more preceding frames (i.e., the degree of motion can be filtered based on motion between preceding frames). A filtering strength is calculated based on the noise variance and the detected degree of motion (625). The video frame is then filtered using the preceding frame and based on the calculated filtering strength (630). In some implementations, the preceding frame used in filtering the video frame can be an unprocessed or unfiltered version, although the preceding frame used in such filtering is typically a processed or filtered version of the preceding frame.

Figure 7:
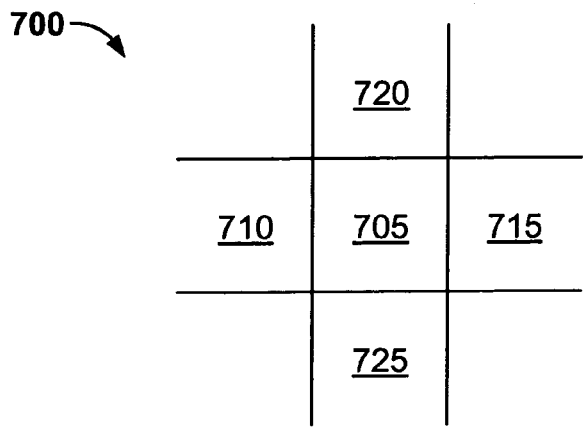
FIG. 7 is a schematic diagram of a set of pixels in a detected image.

FIG. 7 is a schematic diagram of a set 700 of pixels in a detected image. A degree of motion between the detected image and a preceding image is determined on a pixel-by-pixel basis. Accordingly, for a particular pixel 705, motion can be estimated, for example, by comparing the luminance of the pixel 705 with the luminance of a corresponding pixel in the preceding image. If the luminance remains unchanged, it can be determined that no motion is present. If there is a change in luminance above a predetermined motion threshold, it can be determined that motion is present for the pixel 705. In some implementations, the degree of motion for the particular pixel 705 can be estimated by the absolute difference in the luminance values between the consecutive frames. In addition, in some implementations, the degree of motion for the particular pixel 705 can be estimated as a maximum absolute difference in luminance for the particular pixel 705 and its four neighboring pixels 710, 715, 720, and 725 to the left, right, top, and bottom. Accordingly, if the pixel 715 to the right of the particular pixel 705 has a larger absolute difference in luminance between consecutive frames than does the particular pixel 705 or its other neighboring pixels 710, 720, and 725, the motion value assigned to the particular pixel 705 is the calculated motion of the pixel 715 to the right. In some cases, the degree of motion may be based on the maximum among a lesser or greater number of neighboring pixels.

Figure 8:
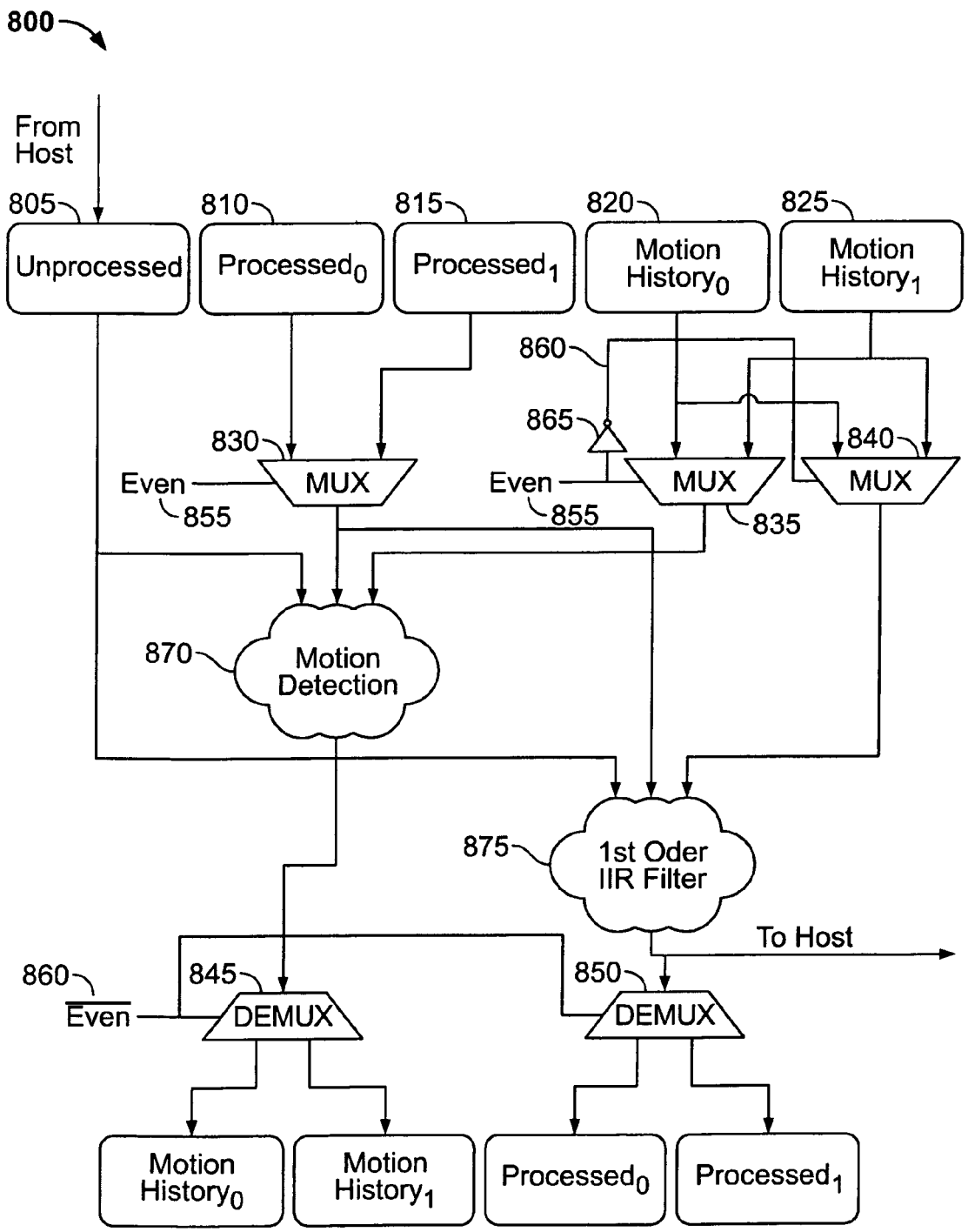
FIG. 8 is a block diagram of a temporal noise reduction system.

FIG. 8 is a block diagram of a temporal noise reduction system 800. The system 800 can be implemented using texture buffers of a GPU and using pixel-shading programs (e.g., ARB fragment programs) running on the GPU. In some implementations, the system 800 can use other types of processors, hardware, or environments. The temporal noise reduction system 800 includes multiple buffers, including an unprocessed frame buffer 805, first and second processed frame buffers 810 and 815, and first and second motion history buffers 820 and 825. The processed frame buffers 810 and 815 and the motion history buffers 820 and 825 are depicted twice in FIG. 8 for purposes of convenience, but it will be understood that the duplicate buffers reflect the same logical or physical buffer.

The temporal noise reduction system 800 also includes first, second, and third binary multiplexers 830, 835, and 840 and first and second demultiplexers 845 and 850. Frames in a video sequence are successively processed by the temporal noise reduction system 800. Each successive frame is either an even frame or an odd frame. The state of the multiplexers 830, 835, and 840 and demultiplexers 845 and 850 is controlled by a binary variable Even 855 or its complement 860, which can be provided by an inverter 865. For even frames, the value of the binary variable Even 855 is 1, and, for odd frames, the value of the Even variable 855 is 0. Each of the multiplexers 830, 835, and 840 and demultiplexers 845 and 850 uses one of its two inputs or outputs when the Even variable 855 has a first value (e.g., 1) and the other of its two inputs or outputs when the Even variable 855 has a second value (e.g., 0).

The temporal noise reduction system 800 includes two pixel-shading programs—a motion detection fragment program 870 (see motion detection module 520 of FIG. 5) and a first order IIR filter fragment program 875 (see first order IIR filtering module 530 of FIG. 5). The multiplexers 830, 835, and 840 and demultiplexers 845 and 850, as well as the pixel shading programs 870 and 875 can be implemented in the logic of a GPU (e.g., as software instructions).

Frames are received by a host device from a camera and are forwarded one at a time to the unprocessed frame buffer 805, where each frame is temporarily stored for processing by the temporal noise reduction system 800. The frame data stored in the unprocessed frame buffer 805 is provided as one input to the motion detection fragment program 870. Assuming, for purposes of illustration, the current frame in the unprocessed frame buffer 805 is an even frame, the first multiplexer 830 provides the frame data stored in the second processed frame buffer 815 as another input to the motion detection fragment program 870. The second multiplexer 835 provides the motion data stored in the second motion history buffer 825 as an input to the motion detection fragment program 870. The motion detection fragment program 870 uses the input data to calculate motion data on a pixel-by-pixel basis and to calculate a parameter relating to temporal filtering weight, as discussed above in connection with the motion detection module 520 of FIG. 5. The calculated motion data and filter weighting parameter are sent to the first demultiplexer 845. Based on the Even complement variable 860, the first demultiplexer 845 causes the received data to be stored in the first motion history buffer 820.

The frame data stored in the unprocessed frame buffer 805 is also provided as one input to the first order IIR filter fragment program 875, along with the frame data stored in the second processed frame buffer 815. Based on the Even variable 855 and the operation of the inverter 865, the third multiplexer 840 provides the motion data stored in the first motion history buffer 820 (i.e., the output of the motion detection fragment program 870 discussed above) as another input to the first order IIR filter fragment program 875. The first order IIR filter fragment program 875 uses the input data to calculate processed frame data for the current frame, which the second demultiplexer 850 stores in the first processed frame buffer 810 under the control of the Even complement variable 860. In addition, the processed frame data is sent to the host device to provide a processed frame for use in one or more client processes.

The next frame, which is an odd frame, that is received by the temporal noise reduction system 800 is stored in the unprocessed frame buffer 805. The motion detection fragment program 870 receives as inputs the frame data from the unprocessed frame buffer 805, the processed frame data from the first processed frame buffer 810, and the motion data from the first motion history buffer 820, the latter two of which were populated by the previous iteration of the fragment programs 870 and 875. The motion detection fragment program 870 generates motion data that is stored in the second motion history buffer 825. The first order IIR filter fragment program 875 receives as inputs the frame data from the unprocessed frame buffer 805, the processed frame data from the first processed frame buffer 810, and the just-stored motion data from the second motion history buffer 825. The first order IIR filter fragment program 875 generates processed frame data that is stored in the second processed frame buffer 815 and delivered to the host device for use in one or more client processes. By implementing the temporal noise reduction system 800 in a GPU using fragment programs and texture buffers, processing of video sequences can be efficiently performed.

GPU processing techniques can also be used for other types of video processing. For example, GPU processing can be used to address potential problems with fixed pattern noise in the images. Because fixed pattern noise is particularly prevalent in areas with low lighting conditions, as discussed above, less gain can be applied to red and blue pixel components in relatively dark image areas (i.e., areas with low luminance values). This effect can be applied during gamma processing, which involves modifying the luminance characteristics to correct the brightness profile of an image. In one implementation, single-channel gamma correction is applied to uniformly modify the luminance of dark areas of an image (e.g., using a look-up table to apply a gamma curve to the input luminance value), and three-channel gamma correction on R, G, and B channels is applied to other areas (e.g., by applying gamma to the three components in the RGB color space). The three-channel gamma correction provides more accurate colors, while the single-channel gamma correction can be performed faster and/or more efficiently.

In another implementation, to achieve improved color accuracy, both single-channel and three-channel gamma correction are determined, and a non-linear interpolation between the two is performed. In addition, the interpolation can be performed using, for example, a fourth order polynomial (e.g., $1-(1-X)^4$, for $0<x<1$, where x represents the input luminance value) to rapidly favor the three-channel gamma correction for higher luminance values to provide more accurate colors and less fixed pattern noise. In some implementations, the non-linear interpolation function can also include an offset to avoid restricting the interpolation range and to ensure that the interpolation includes some contribution from the three-channel gamma correction calculation. For example, twenty five percent (25%) or fifty percent (50%) of the three-channel gamma value can be blended with the single-channel gamma value provided by the fourth order polynomial. This blending can be performed using an interpolation function:

$$g(x)=b+(1-b)*f(x), \qquad (6)$$

where f(x) is a polynomial function, such as $f(x)=1-(1-x)^4$, for $0<x<1$, and $g(x)=0.25+0.75*f(x)$, for example. The function g(x) is then multiplied by the single-channel-gamma value and added to $(1-g(x))$ multiplied by the three-channel-gamma value to produce an interpolated gamma correction. The use of a non-linear interpolation function can provide a rapid convergence toward three-channel-gamma correction as luminance increases from zero (or some other relatively low luminance value). This technique avoids an excessive loss of color when the single-channel gamma correction calculation is favored for low luminance values, but can slightly increase the visibility of the fixed pattern noise depending on the amount of offset and how rapid the convergence is.

Figure 9:
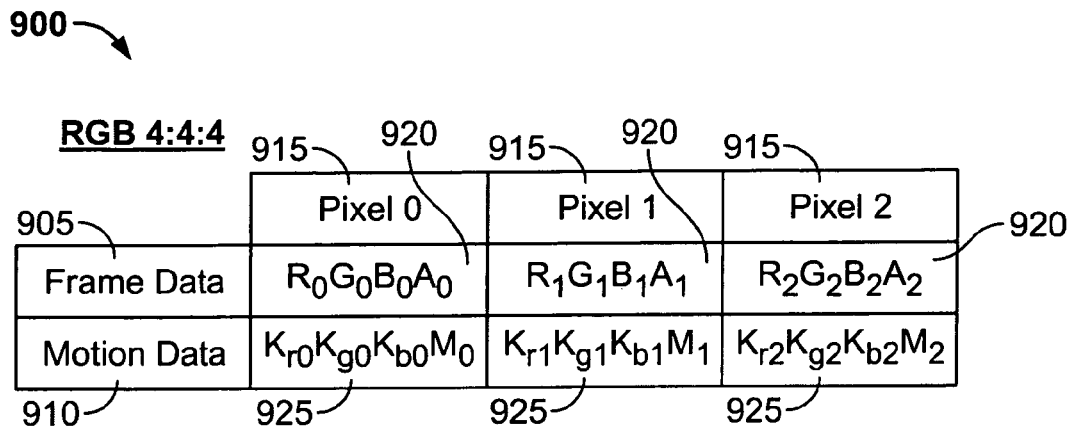
FIG. 9 is a chart showing representative contents of the buffers described in FIG. 8 when the pixel data is in RGB 4:4:4 format.

FIG. 9 is a chart 900 showing representative contents of the buffers described in FIG. 8 when the pixel data is in RGB 4:4:4 format. Typically, the texture buffers of a GPU include space for four data values for each pixel entry. In some implementations of the temporal noise reduction system 800 of FIG. 8, the buffers that store unprocessed and processed frame data 905 (i.e., the unprocessed frame buffer 805 and the first and second processed frame buffers 810 and 815) include a red value $R_n$, a green value $G_n$, a blue value $B_n$, and an extra parameter value $A_n$ for each pixel n 915. The extra parameter values $A_n$ are ignored for purposes of temporal filtering. Each combined RGB value 920 constitutes a vector-based pixel value.

The buffers that store motion data 910 (i.e., the first and second motion history buffers 820 and 825) include filtering weights $K_{rn}$, $K_{gn}$, and $K_{bn}$ corresponding to each of the red, green, and blue components or values and a motion value $M_n$ for each pixel n 915. As a result, filtering weights $K_{rn}$, $K_{gn}$, and $K_{bn}$ and a motion value $M_n$ for each pixel n 915 are stored in a single entry 925 of the motion history buffers 820 and 825. The motion value $M_n$ for each pixel is determined using luminance information (e.g., Y in the YUV space) for the pixel based on a comparison with luminance information for a preceding frame. A luminance value can be computed in a single instruction based on the red, green and blue values from the RGB 4:4:4 format. By calculating filtering weights per component (i.e., calculating $K_{rn}$, $K_{gn}$, and $K_{bn}$), an independent noise variance can be determined for each component, and noise filtering can be independently tuned for each component. Thus, the motion detection module 520 of FIG. 5 and/or the motion detection fragment program 870 of FIG. 8 can be used to calculate per-component filter weights $K_r$, $K_g$, and $K_b$. Likewise, the first order IIR filtering module 530 of FIG. 5 and the first order IIR filter fragment program 875 of FIG. 8 can be used to perform filtering on a per-component basis.

Figure 10:
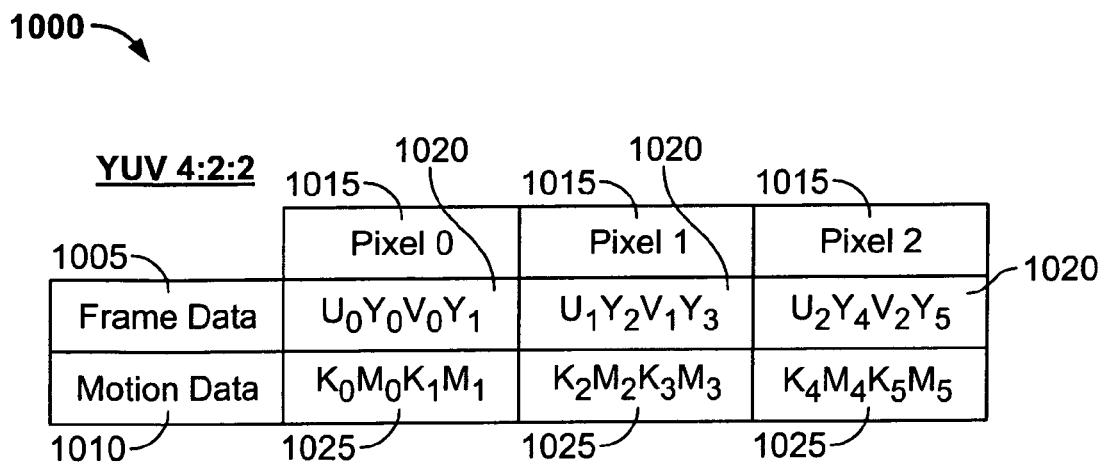
FIG. 10 is a chart showing representative contents of the buffers described in FIG. 8 when the pixel data is in YUV 4:2:2 format.

FIG. 10 is a chart 1000 showing representative contents of the buffers described in FIG. 8 when the pixel data is in YUV 4:2:2 format. Using the YUV 4:2:2 format allows the buffers to be two times smaller than in the RGB 4:4:4 case. This is because every two pixels share chrominance values U and V. In other words, while each pixel has a unique luminance value Y, each pair of pixels use the same chrominance values U and V. Thus, in some implementations of the temporal noise reduction system 800 of FIG. 8, the buffers that store unprocessed and processed frame data 1005 (i.e., the unprocessed frame buffer 805 and the first and second processed frame buffers 810 and 815) include chrominance values $U_n$ and $V_n$ and two luminance values $Y_{2n}$ and $Y_{2n+1}$ for each pixel data entry 1015. The frame data 1005 for each pixel entry 1015, however, defines pixel values for two pixels (at 1020). For example, a first pixel includes chrominance values $U_1$ and $V_1$ and a luminance value $Y_1$, and a second pixel includes the same chrominance values $U_1$ and $V_1$ but a different luminance value $Y_2$. Similarly, a third pixel includes chrominance values $U_2$ and $V_2$ and a luminance value $Y_3$, and a fourth pixel includes the same chrominance values $U_2$ and $V_2$ but a different luminance value $Y_4$. The combination of a luminance value $Y_{2n}$ or $Y_{2n+1}$ and the corresponding chrominance values $U_n$ and $V_n$ constitutes a vector-based pixel value.

The buffers that store motion data 1010 (i.e., the first and second motion history buffers 820 and 825) include two filtering parameters $K_{2n}$ and $K_{2n+1}$, one for each of the pixels that share chrominance values, and two motion values $M_{2n}$ and $M_{2n+1}$, one for each of the pixels that share chrominance values. Thus, the motion data 1010 for each pixel entry 1015 stores filtering parameters and motion values for two pixels (at 1025). The motion value M for each pixel is determined using the available luminance information (i.e., the luminance value Y) for the pixel. In the YUV 4:2:2 case, filtering weights are calculated per pixel based, for example, on the maximum of the red, blue, and green gain values used in detecting the image, as determined from ancillary data received from the camera by the host device. Noise filtering can then be performed for the luminance component (e.g., $Y_1$) of each pixel using the corresponding filtering weight (e.g., $K_1$) and for the chrominance components (e.g., $U_1$ and $V_1$) using one of the two corresponding filtering weights (e.g., Minimum($K_1$, $K_2$)). Pixel formats other than RGB 4:4:4 and YUV 4:2:2, such as YUV 4:4:4 or YUV 4:1:1, can also be used in connection with one or more of the described techniques.

Figure 11:
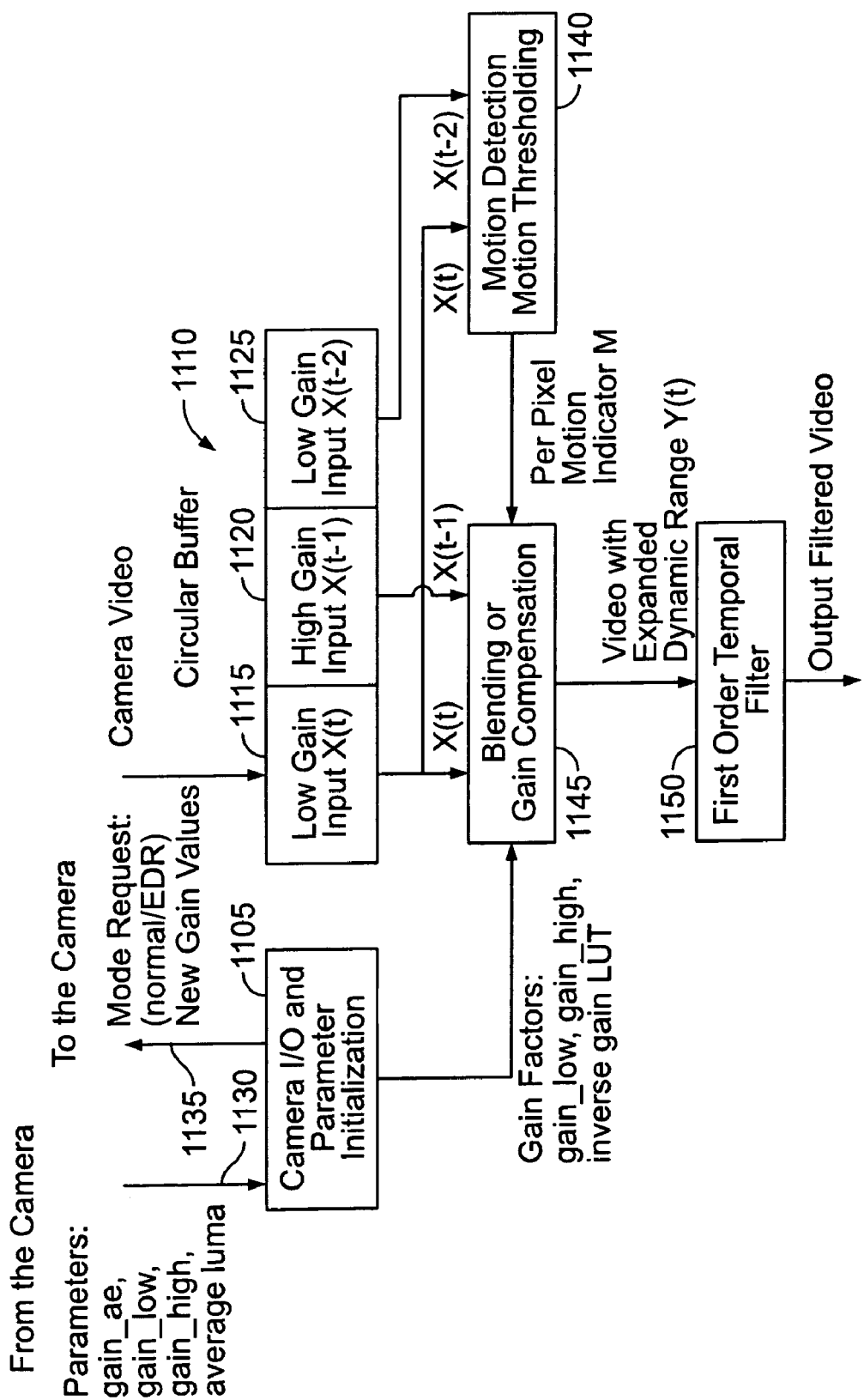
FIG. 11 is a block diagram of a dynamic range expansion system for a video sequence.

FIG. 11 is a block diagram of a dynamic range expansion system 1100 for a video sequence. The dynamic range expansion system 1100 can be implemented, for example, at least in part using software running on a computer or a GPU. In general, the system 1100 performs dynamic range expansion by combining frames detected using two or more different gain levels. The illustrated example and the following description depict a dynamic range expansion technique using two gain levels, although implementations can use more than two gain levels. Each gain level is analogous to an exposure level on a conventional camera—a higher gain corresponds to a longer exposure, while a lower gain corresponds to a shorter exposure. With a high gain, additional details of areas with low light can be obtained but areas with greater light can become washed out. A low gain may enable greater detail in the higher lighting areas but low light areas lack detail. Dynamic range expansion allows details from both a high gain image and a low gain image to be combined in a single image.

The dynamic range expansion system 1100 includes an interface 1105 for communicating with a camera or image sensor and a circular buffer 1110 that, in the illustrated implementation, includes three frame buffers 1115, 1120, and 1125. The dynamic range expansion system 1100 also includes a motion detection module 1140 for detecting motion between successive received frames and a blending module 1145 for performing blending or gain compensation on received frames. A first order temporal filter 1150 is used to perform temporal noise reduction on blended or gain compensated pixels.

The interface 1105 can be used to request and/or receive settings data. For example, the interface 1105 receives video parameters (as indicated at 1130), such as an auto-exposure gain level, a gain level used to detect low gain frames, a gain level used to detect high gain frames, and an average luminance. The interface 1105 can also instruct the camera to switch modes by sending requested settings to the camera (as indicated at 1135). In general, two camera gain modes are used for performing dynamic range expansion—an auto-exposure mode and an expanded dynamic range mode. In the auto-exposure mode, the camera determines an appropriate gain level based on environmental lighting conditions (e.g., to achieve a predetermined image quality or an average luminance for the image or a portion of the image). In the expanded dynamic range mode, the camera switches between a high gain (e.g., higher than the gain level identified in the auto-exposure mode) and a low gain (e.g., lower than the auto-exposure mode gain level) to detect each successive, temporally spaced frame. Thus, even frames are detected using a high gain and odd frames are detected using a low gain, or vice versa. In some implementations, the camera determines the gain values for use in the expanded dynamic range mode, while in other implementations the gain values can be determined by the dynamic range expansion system 1100 and sent to the camera (as indicated at 1135).

The circular buffer 1110 stores frame data received from the camera or image sensor. Because each successive frame is detected using alternating gain values, each sequential frame buffer 1115, 1120, or 1125 includes video data for a frame detected with a different gain than the adjacent frame buffer or buffers in the sequence. As each new frame is received, the frames in the circular buffer 1110 are shifted to the next frame buffer 1120 or 1125 or discarded (in the case of the frame stored in the third frame buffer 1125), and the new frame is inserted in the first frame buffer 1115. In the illustrated example, the current frame X(t) stored in the first frame buffer 1115 includes frame data detected using a low gain level, the preceding frame X(t−1) stored in the second frame buffer 1120 includes frame data detected using a high gain level, and the next preceding frame X(t−2) stored in the third frame buffer 1125 includes frame data detected using the low gain level. When the next frame X(t+1), which will be detected using the high gain level, arrives, it will be stored in the first frame buffer 1115, and the original contents of the first frame buffer 1115 and the second frame buffer 1120 will be shifted, respectively, to the second frame buffer 1120 and the third frame buffer 1125. Alternatively, the content of the buffers is not moved between the buffers; instead, shifting between the buffers is performed by manipulating buffer pointers.

The motion detection module 1140 detects motion between successive frames having the same gain level to generate a motion indicator M(t). Motion is determined on a per-pixel basis based, for example, on an absolute difference in luminance values for corresponding pixels in the successive frames. The motion indicator M(t) can be determined in the same manner as or in a different way than the filtered motion vector M(t) or the current motion vector CurrentMotion(t) discussed in connection with FIG. 5. In the illustrated example, motion is identified between the frame X(t) stored in the first frame buffer 1115 and the frame X(t−2) stored in the third frame buffer 1125. In an alternative implementation, motion can be identified between frames detected using different gain levels (i.e., between the frame X(t) stored in the first frame buffer 1115 and the frame X(t−1) stored in the second frame buffer 1120). For example, each frame can be normalized by performing gain compensation (e.g., to remove the effects of the gain applied in detecting the image) before identifying per-pixel motion. Other techniques for detecting motion can also be used.

The blending module 1145 performs blending of pixels from frames detected using different gain levels. Typically, blending is performed only on pixels for which motion is not identified (e.g., to avoid blending pixels that do not correspond to the same object). The blending module 1145 generates a current frame with expanded dynamic range Y(t) by combining the frame data from the first frame buffer 1115 and the second frame buffer 1120 according to:

$$Y(t)=[(K1*X(t)/\text{gain\_low})+(K2*X(t-1)/\text{gain\_high})]/(K1+K2), \text{ for } M(t)<MTh, X(t)/\text{gain\_low}, \text{ for } M(t)>MTh, \quad (7)$$

for the case where the current frame X(t) is detected using the low gain level, where gain_low and gain_high define the gain factors used to detect the images (e.g., gain_low=0.5 and gain_high=1.5); K1 and K2 are blending factors for low gain images and high gain images, respectively; and MTh is a motion threshold. For pixels that are identified as having motion above a threshold level, gain compensation is applied to normalize the pixel value without performing blending (and thus without expanding the dynamic range of such pixels). In some implementations, such as when more than two gain levels are used to detect images, blending may involve additional frames.

In the case where the current frame X(t) is detected using the high gain level, the expanded dynamic range frame Y(t) can be calculated according to:

$$Y(t)=[(K1*X(t-1)/\text{gain\_low})+(K2*X(t)/\text{gain\_high})]/(K1+K2), \text{ for } M(t)<MTh, X(t)/\text{gain\_high}, \text{ for } M(t)>MTh. \quad (8)$$

The value of the blending factors or parameters K1 and K2 define a relative contribution of each pixel from each image and can be calculated according to:

$$Kn=128-abs(128-\text{LumaValue}), \quad (9)$$

where n=1 for low gain frames, n=2 for high gain frames, and LumaValue is the luminance value for the pixel in the high gain or low gain image and where luminance values fall within a range of 0 to 255. Other algorithms or techniques for determining blending factors can also be used. If the camera response to changes in gain is linear, gain compensation can be achieved by applying linear scaling, as in the gain compensation portions of the equations above. In some cases, the camera response may be non-linear, in which case a look-up table (LUT) can be used to identify appropriate scaling (e.g., instead of using the gain_low and gain_high values). The values of an inverse gain look-up table can be provided, for example, by the interface 1105 or stored in a memory associated with the blending module 1145.

The expanded dynamic range frame Y(t) is then processed by the first order temporal filter 1150 to perform temporal noise reduction on blended or gain compensated pixels. The first order temporal filter 1150 can be implemented using the temporal filter 500 of FIG. 5 and/or the temporal noise reduction system 800 of FIG. 8. Thus, the expanded dynamic range frame Y(t) can correspond to the input frame x(t) illustrated in and described with reference to FIG. 5. The first order temporal filter 1150 generates a filtered video output.

Figure 12:
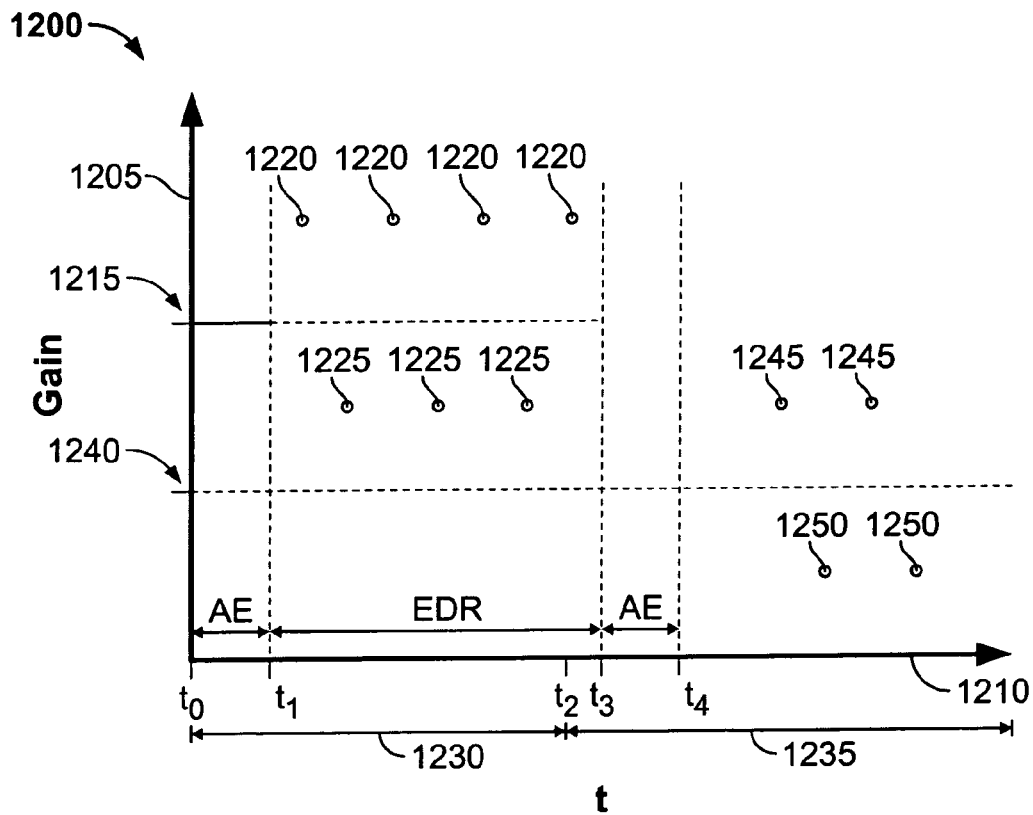
FIG. 12 is a graph of a process for identifying appropriate gains for use by the camera in an expanded dynamic range mode.

FIG. 12 is a graph 1200 of a process for identifying appropriate gains for use by the camera in an expanded dynamic range mode. The graph 1200 represents gain level on the vertical axis 1205 and time on the horizontal axis 1210. At an initial time t0, the camera is placed in an auto-exposure mode (AE) in which the camera detects lighting conditions and determines an appropriate gain level for use in detecting images. Generally, the gain level identified in the auto-exposure mode assumes that all frames are detected using the same gain level, in contrast to an expanded dynamic range mode. In the example illustrated in the graph 1200, time t0 falls within a period 1230 of low lighting conditions, and the auto-exposure gain level is set at a first gain level 1215. After determining the appropriate gain level, the camera is switched into the expanded dynamic range mode (EDR) at time $t_1$. Control over the mode can be handled, for example, by the interface 1105 of the dynamic range expansion system 1100 of FIG. 11.

In the expanded dynamic range mode, the gain level is alternated between a high gain and a low gain for detecting each successive frame. For example, odd frames are detected (as indicated at 1220) using a high gain of two times the first gain level 1215, and even frames are detected (as indicated at 1225) using a low gain of one-half the first gain level 1215. The high gain and low gain levels can be determined by the camera or can be assigned by the dynamic range expansion system 1100 through the interface 1105.

At time $t_2$, the lighting conditions change (e.g., someone flips on a light switch), and a period 1235 of bright lighting conditions begins. This change is detected, for example, by the dynamic range expansion system 1100 through the interface 1105 based on a time-averaged luminance parameter received from the camera or calculated by the dynamic range expansion system 1100. Generally, minor fluctuations in lighting conditions do not have a noticeable impact on the time-averaged luminance. If the time-averaged luminance changes by more than some relatively small percentage or absolute amount from the luminance level detected during the last auto-exposure mode, it can be determined that the lighting conditions have changed. Accordingly, at time $t_3$, the camera is placed back in the auto-exposure mode (e.g., under the control of the dynamic range expansion system 1100) to identify a second gain level 1240 for use during the period 1235 of bright lighting conditions.

At time $t_4$, after the second gain level 1240 is determined, the camera is again switched into the expanded dynamic range mode, and new high gain and low gain levels are calculated to allow the gain levels to adapt to the new lighting conditions. For example, odd frames are detected (as indicated at 1245) using a high gain of two times the second gain level 1240, and even frames are detected (as indicated at 1250) using a low gain of one-half the second gain level 1240. Additional mode changes and determinations of appropriate gain levels can be performed if and when lighting conditions change.

Figure 13:
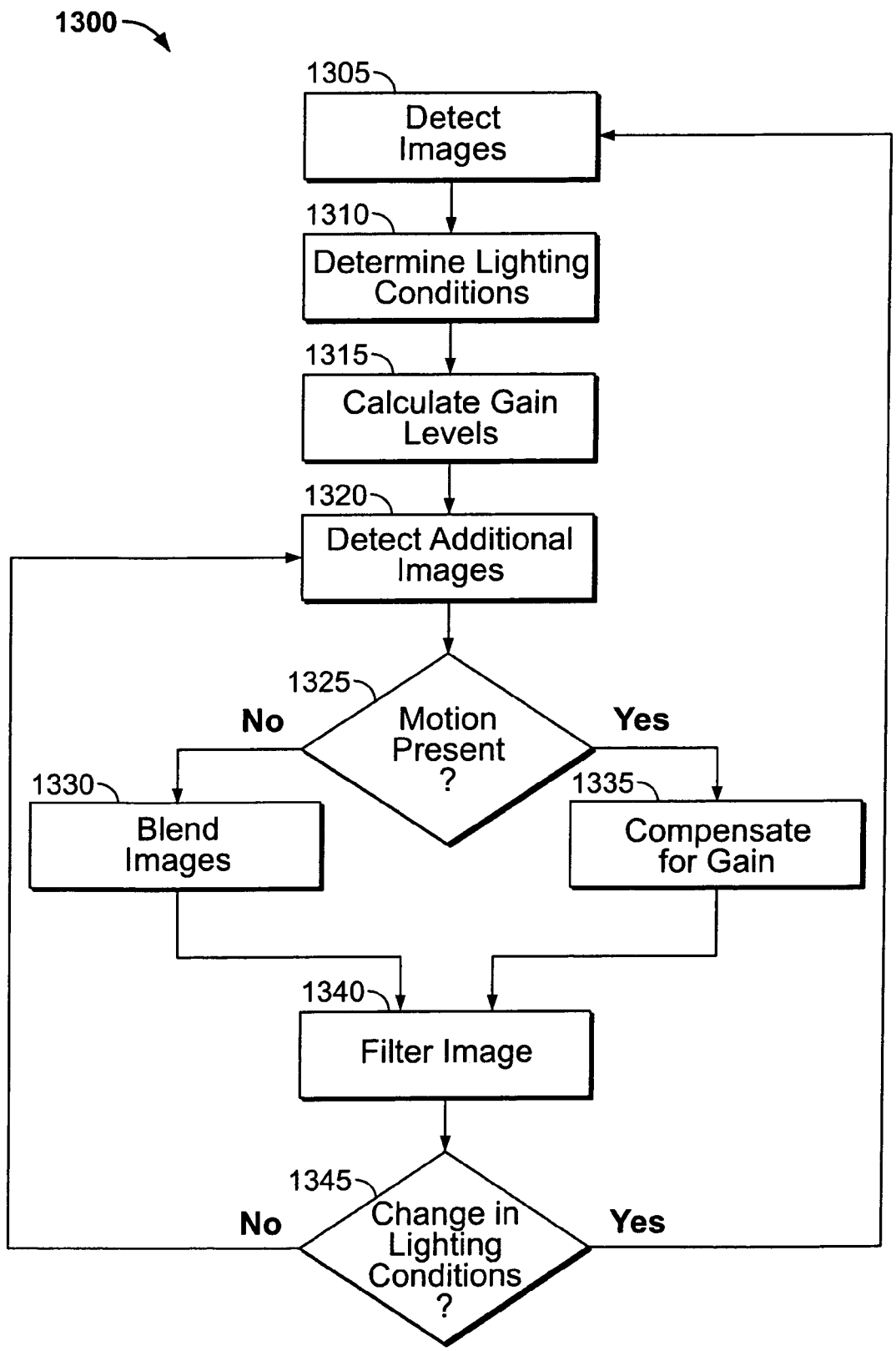
FIG. 13 is a flow diagram of a process for performing dynamic range expansion of video images.

FIG. 13 is a flow diagram of a process 1300 for performing dynamic range expansion of video images. An image sensor detects one or more video still images (1305), and lighting conditions for the detected images are determined (1310). The images can be detected in an auto-exposure mode, for example, and lighting conditions can be determined explicitly by measuring light levels or implicitly by identifying a gain level needed to achieve an acceptable image quality. Based on the lighting conditions, two or more gain levels for alternately using in detecting images are calculated or identified (1315). The image sensor detects additional video still images using the two or more gain levels (1320). For example, odd frames can be detected using a low gain level and even frames can be detected using a high gain level. Alternatively, four different gain levels (e.g., two different high gain levels and two different low gain levels) can be used in a repeating sequence to detect frames to further increase dynamic range.

A determination is made as to whether motion between different ones of the additional video still images is present (1325). The motion determination is typically made for purposes of determining whether information associated with a pixel in one image can be used to provide reliable information about a corresponding pixel in another image (e.g., for purposes of dynamic range expansion, filtering, or color correction). The motion determination is generally made on a pixel-by-pixel basis, although in some cases motion can be detected for blocks of pixels. A motion value for each pixel can also be assigned based on the motion values of one or more adjacent or nearby pixels (e.g., using a maximum or average value function). In some implementations, motion is determined to be present for a pixel at a particular pixel address based on whether there is a change in the luminance (and/or other characteristics, such as color, even if the luminance remains unchanged) of the pixel at the particular pixel address between the images.

In other implementations, additional processing may be performed to identify relative motion of objects in the images (e.g., an object in the foreground, such as a vehicle, moving relative to the background) and/or consolidated motion of the entire image (e.g., through panning of the camera). In such cases, it is possible to identify corresponding pixels even though they are located in a different location within the image. Blending, temporal filtering, and/or other processing may be selectively performed on the different images in which at least some of the pixels are offset between the different images. For example, blending can be performed between a block of pixels in one image and a corresponding but offset block of pixels in another image. In some implementations, such as when the frame rate is sufficiently high to effectively avoid noticeable blurring, it is possible to omit motion detection.

If it is determined that motion is not present between the images (or portions thereof), the images (or portions thereof) are blended (1330). Typically, blending is performed on a per-pixel basis for pixels in which motion is not present. As discussed above, however, the motion determination can be relative to other surrounding pixels (e.g., motion with respect to corresponding pixels in different images is determined not to be present if a block of pixels containing the corresponding pixels moves as a block). As such, a pixel from one image can be blended with a corresponding pixel from a different image, even though the corresponding pixel may have a different pixel address (e.g., because of movement of the block of pixels). Blending can be used to provide an expanded dynamic range for a resulting blended image.

If it is determined that motion is present between images (or portions thereof), the current image (or portions thereof) is gain compensated to produce a normalized image (1335). As with blending, gain compensation is typically performed on a per-pixel basis for pixels in which motion is present. For example, if motion is determined to be present between images for a particular pixel, the pixel is multiplied by an inverse of the gain level used to detect the image to produce a gain-compensated image that has approximately the same appearance as if the frame had been detected in an auto-exposure mode.

Each blended and/or gain-compensated image is filtered to remove noise (1340). For example, frames can be processed using a temporal filter. In some implementations, other types of filtering can be used, such as spatial filtering. The filtered image is a processed frame that has an expanded dynamic range and reduced noise. The processed frame can be used to replace one of the images from a sequence of the additional video still images for use in subsequent video display or processing.

After each frame or group of frames, a determination is made as to whether lighting conditions have changed (1345). This determination can be based, for example, on whether an average luminance of a sequence of images has changed above a certain amount or is changing at a sufficient rate. If so, the process 1300 returns to detecting one or more video still images (1305) and determining lighting conditions for the detected images (1310). This determination can then be used to identify new gain levels for use in detecting additional images. If the lighting conditions have not changed, the process 1300 continues detecting additional video still images using the two or more gain levels (1320).

The invention and one or more of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

Some processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, certain operations of the techniques can be performed in parallel or in a different order than is depicted and described. In addition, the described techniques can be used in connection with performing other types of processing on video sequences. Accordingly, other implementations are within the scope of the following claims.

What is claimed is:

1. A method comprising:
    receiving data at a central processing unit of a computing device, the received data corresponding to a sequence of video images detected by an image sensor;
    forwarding the received data to a graphics processor that includes at least a microprocessor configured for processing three-dimensional graphics data, the central processing unit and the graphics processor included as components of the computing device, wherein the central processing unit is configured to communicate with the graphics processor using a computer bus of the computing device;
    processing the received data using the graphics processor to adjust at least one visual characteristic of at least one of the video images corresponding to the received data, wherein the processing includes calculating filtered motion data and temporal-filtered pixel data for a frame in the sequence of video images, wherein calculating filtered motion data includes calculating data related to motion represented in successive frames in the sequence of video images; and
    returning the processed data to the central processing unit of the computing device for use by a client process.

2. The method of claim 1 wherein the sequence of video images comprises image data received at about thirty frames per second.

3. The method of claim 1 wherein the received data comprises pixel values for each of a plurality of pixels in each video image.

4. The method of claim 1 wherein the microprocessor of the graphics processor uses a vector-based instruction set.

5. The method of claim 1 wherein the microprocessor of the graphics processor is operable to automatically perform a plurality of iterations of at least one instruction on multiple data items.

6. The method of claim 1 wherein the central processing unit performs one of compression or encoding of the processed data.

7. The method of claim 1 wherein the at least one visual characteristic is selected from the group consisting of noise reduction, color correction, scaling, sharpness, and color calibration.

8. The method of claim 1 further comprising using a first pixel shading program to calculate the filtered motion data for the frame and a second pixel shading program to calculate the temporal-filtered pixel data for the frame.

9. The method of claim 8 further comprising providing two buffers associated with the graphics processor for use in storing temporal-filtered pixel data for successive frames and providing two buffers associated with the graphics processor for use in storing filtered motion data for the successive frames, wherein each buffer stores one of input data or output data for one of the successive frames and stores the other of input data or output data for another of the successive frames.

10. The method of claim 8 wherein temporal filtering performed by the second pixel shading program is based at least in part on the filtered motion data and a luminance value for areas of the frame.

11. The method of claim 1 wherein processing the received data comprises performing gamma correction on one or more of the video images based on the luminance of at least one area of the one or more video images.

12. The method of claim 11 wherein performing gamma correction comprises applying a single-channel luminance modification to relatively dark areas of the one or more video images and applying a multi-channel luminance modification to other areas of the one or more video images.

13. The method of claim 11 wherein performing gamma correction comprises:
determining a single-channel gamma correction and a multi-channel gamma correction; and
interpolating the single-channel gamma correction and the multi-channel gamma correction using an interpolation function.

14. The method of claim 13 wherein the interpolation function includes an offset to increase a contribution of the multi-channel gamma correction.

15. The method of claim 1, wherein calculating the temporal-filtered pixel data includes using pixel data from at least one frame preceding the frame or at least one frame subsequent to the frame to filter deviations in pixel values between temporally separated frames.

16. The method of claim 1, wherein calculating the filtered motion data comprises:
determining a degree of motion between the frame and a frame immediately preceding the frame;
filtering the degree of motion based on a degree of motion between at least two frames preceding the frame; and
determining a strength for temporal filtering of the frame based on the filtered degree of motion.

17. An article of manufacture comprising a non-transitory computer-readable storage device storing instructions for causing data processing apparatus to:
receive data at a central processing unit of a computing device, the received data relating to a sequence of video images detected by an image sensor;
forward the received data to a graphics processor that includes at least a microprocessor configured for processing three-dimensional graphics data, the central processing unit and the graphics processor included as components of the computing device, wherein the central processing unit is configured to communicate with the graphics processor using a computer bus of the computing device;
process the received data using the graphics processor to adjust at least one visual characteristic of at least one of the video images corresponding to the received data, wherein the processing includes calculating filtered motion data and temporal-filtered pixel data for a frame in the sequence of video images, wherein calculating filtered motion data includes calculating data related to motion represented in successive frames in the sequence of video images; and
returning the processed data to the central processing unit of the computing device for use by a client process.

18. The article of claim 17 wherein the at least one visual characteristic comprises at least one of noise reduction or color adjustment.

19. The article of claim 17 wherein processing the received data comprises:
detecting motion between a particular frame and a preceding frame in the sequence of video images; and
filtering the particular frame using the preceding frame based at least in part on detected motion.

20. The article of claim 19 wherein filtering the particular frame is based at least in part on an estimated noise level for the particular frame.

21. The article of claim 20 wherein filtering the particular frame is based at least in part on a luminance value of pixels in the particular frame.

22. The article of claim 20 wherein processing the received data further comprises filtering motion data.

23. The article of claim 22 wherein filtering motion data comprises assigning a motion value for each pixel according to a maximum motion of the pixel and at least one adjacent pixel.

24. The article of claim 22 wherein processing the received data further comprises:
alternately generating motion data for the particular frame using motion data for a preceding frame stored in a first texture buffer and storing the motion data for the frame in a second texture buffer, and generating motion data for a subsequent frame using the motion data stored in the second texture buffer and storing the motion data for the subsequent frame in the first texture buffer; and
alternately filtering pixel data for the particular frame using filtered pixel data for a preceding frame stored in a third texture buffer and storing the filtered pixel data for the frame in a fourth texture buffer, and filtering pixel data for a subsequent frame using the filtered pixel data stored in the fourth texture buffer and storing the filtered pixel data for the subsequent frame in the third texture buffer.

25. The article of claim 24 wherein the motion data comprises a value indicating an estimated degree of motion between frames and a value indicating a filtering strength.

26. The article of claim 24 wherein processing the received data comprises filtering the particular frame using the preceding frame based at least in part on an estimated noise level for the particular frame.

27. The article of claim 17 wherein the received data is processed using both single-channel gamma correction and multi-channel gamma correction.

28. The article of claim 27 wherein the received data is processed using a function to interpolate the single-channel gamma correction and the multi-channel gamma correction according to a luminance value, wherein the function converges toward the multi-channel gamma correction with increasing luminance values.

29. An image processing system comprising:
a central processing unit of a computing device operable to receive data defining a sequence of video images from an image sensor;
a graphics processor including at least a microprocessor configured for processing three-dimensional graphics data, wherein the graphics processor and the central processing unit are included in the computing device, and the graphics processor is configured to communicate with the central processing unit using a computer bus of the computing device;

a memory adapted to store processed data, wherein the processed data is processed by forwarding the received data to the graphics processor from the central processing unit, processing the received data using the graphics processor to adjust at least one visual characteristic of one or more of the video images defined by the received data, wherein the processing includes calculating filtered motion data and temporal-filtered pixel data for a frame in the sequence of video images, wherein calculating filtered motion data includes calculating data related to motion represented in successive frames in the sequence of video images, and returning the processed data to the central processing unit.

30. The system of claim 29 wherein the central processing unit is further operable to preprocess the received data before sending the received data to the graphics processor.

31. The system of claim 29 wherein the central processing unit receives the processed data from the graphics processor for use by a client application.

32. The system of claim 29 wherein the graphics processor includes at least a first texture buffer and a second texture buffer and is operable to alternately:
  process received data for a particular frame using processed data from a preceding frame stored in the first texture buffer to generate new processed data and store the new processed data in the second texture buffer; and
  process received data for a particular frame using processed data from a preceding frame stored in the second texture buffer to generate new processed data and store the new processed data in the first texture buffer.

33. The system of claim 32 wherein the graphics processor processes the received data based on a detected amount of motion between successive frames and an estimated noise level for each particular frame.

\* \* \* \* \*